United States Patent
Akiyama

(10) Patent No.: US 7,301,591 B2
(45) Date of Patent: Nov. 27, 2007

(54) LIQUID CRYSTAL DISPLAY DEVICE WHEREIN THE NUMBER OF LIGHT EMITTING ELEMENTS ACTIVATED DIFFERS DEPENDING ON WHETHER DISPLAY IS PERFORMED BY THE FIRST OR SECOND LIQUID CRYSTAL PANEL

(75) Inventor: Takashi Akiyama, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 19 days.

(21) Appl. No.: 10/490,961

(22) PCT Filed: Sep. 27, 2002

(86) PCT No.: PCT/JP02/10085

§ 371 (c)(1),
(2), (4) Date: Mar. 26, 2004

(87) PCT Pub. No.: WO03/029884

PCT Pub. Date: Apr. 10, 2003

(65) Prior Publication Data

US 2005/0073627 A1    Apr. 7, 2005

(30) Foreign Application Priority Data

Sep. 28, 2001    (JP) ............... 2001-300278

(51) Int. Cl.
*G02F 1/1335* (2006.01)
*G02F 1/1347* (2006.01)
(52) U.S. Cl. .................. 349/96; 349/61; 349/65; 349/74; 349/96; 362/612
(58) Field of Classification Search .......... 349/65, 349/74, 75, 96, 77–78, 68
See application file for complete search history.

(56) References Cited

U.S. PATENT DOCUMENTS 5,982,540 A * 11/1999 Koike et al. ................ 359/487
6,801,271 B2 * 10/2004 Han et al. ..................... 349/74

(Continued)

FOREIGN PATENT DOCUMENTS

JP    3-2994    1/1991

(Continued)

*Primary Examiner*—Andrew Schecter
*Assistant Examiner*—W. Patty Chen
(74) *Attorney, Agent, or Firm*—Westerman, Hattori, Daniels & Adrian, L.L.P.

(57) ABSTRACT

A liquid crystal display device has first and second liquid crystal panels (101, 102) mainly comprising liquid crystal cells (107, 108), respectively, disposed back to back to enable the visual recognition of the liquid crystal panels (101, 102). A light guide plate (112) is disposed between the first liquid crystal panel (101) and the second liquid crystal panel (102) with a light source (114) located adjacent to its one end face (112c), and a polarization separator (110) located between the first liquid crystal panel (101) and the light guide plate (112). Light emitted from the light guide plate (112) is split into two beams of polarized light: one is emitted to the first liquid crystal panel (101), and the other to the second liquid crystal panel (102) through the light guide plate (112). This constitution thins down a both-sided display liquid crystal display device and reduces power consumption.

7 Claims, 7 Drawing Sheets

U.S. PATENT DOCUMENTS

2003/0016321 A1* 1/2003 Takizawa .................... 349/113

FOREIGN PATENT DOCUMENTS

| JP | 9-90325 | | | 4/1997 |
| --- | --- | --- | --- | --- |
| JP | 10090678 | A | * | 4/1998 |
| JP | 2001-111476 | | | 4/2001 |
| JP | 2001-186227 | | | 7/2001 |
| JP | 2001-194661 | | | 7/2001 |
| JP | 2002-189230 | | | 7/2002 |
| JP | 2002189230 | A | * | 7/2002 |
| JP | 2002-258284 | | | 9/2002 |

* cited by examiner

LIQUID CRYSTAL DISPLAY DEVICE WHEREIN THE NUMBER OF LIGHT EMITTING ELEMENTS ACTIVATED DIFFERS DEPENDING ON WHETHER DISPLAY IS PERFORMED BY THE FIRST OR SECOND LIQUID CRYSTAL PANEL

TECHNICAL FIELD

The present invention relates to a liquid crystal display device, and particularly to a liquid crystal display device for both-sided display, having two liquid crystal panels disposed back to back to enable the visual recognition of the liquid crystal panels.

BACKGROUND TECHNOLOGY

A liquid crystal display device has made rapid progress as a low power, thin and light-weighed display device in various fields. Particularly in recent years, a portable phone (cellular phone) also has made drastic progress and all types of portable phones employ the liquid crystal display device.

The liquid crystal display device employed in the portable phone is in many cases a reflective liquid crystal display device that is designed especially from the view point of low power consumption so that the life time of a battery is elongated. Furthermore, almost all of the reflective liquid crystal display devices are a transflective liquid crystal display device incorporating a backlight therein. The reason for this is that a liquid crystal display device is not a light-emitting display device and therefore, when the device is used under conditions with insufficient light intensity, i. e., under dark conditions, an image to be displayed on the device becomes difficult to view, thereby a backlight illumination is adopted to improve the visibility of an image to be displayed.

Additionally, as information communication using, for example e-mail, makes progress, a liquid crystal display screen also becomes large in size and accordingly, a portable phone becomes large in size. To address such problem, a portable phone has been developed which advantageously allows protection of the liquid crystal display screen and increase in portability.

A user of the portable phone usually carries the phone in a folded form and accordingly, every time when the user wants to know the current time or get information from display of incoming call, etc., the user needs to unfold the phone. To eliminate such inconvenience, a recent portable phone tends to be constructed so that a second liquid crystal panel is disposed independently of a first liquid crystal panel in a visible position when the portable phone is being folded, on which various types of information is always displayed.

In this case, since the first liquid crystal panel used when the portable phone is being unfolded and the second liquid crystal panel used when the portable phone is being folded both need to be used even under dark conditions, a transflective liquid crystal panel incorporating a backlight therein has been used.

FIG. 13 illustrates the exemplary configuration of a portable phone of the type conventionally used. The portable phone 1000 is constructed such that a main unit 1100 and a display unit 1200 are coupled together by a hinge 1300 so that the main unit 1100 and display unit 1200 are rotatable around the hinge 1300 and openable and closable relative to each other. Furthermore, the portable phone includes a key board 1109 provided on an upper surface of the main unit 1100 and is further constructed the display unit for a both-sided display such that a first liquid crystal display device 1101 and a second liquid crystal display device 1102 are disposed back to back in the display unit 1200.

The first liquid crystal display device 1101 comprises a first liquid crystal panel 1103 and a first backlight 1104, and the second liquid crystal display device 1102 comprises a second liquid crystal panel 1105 and a second backlight 1106. Moreover, a first windshield glass 1107 and a second windshield glass 1108 are provided on an internal (right side in the figure) surface and an external (left side in the figure) surface of a casing of the display unit 1200 to allow a user to view the liquid crystal panels 1103, 1105, respectively.

How the portable phone 1000 shown in FIG. 13 displays images will be explained below. When a user uses this portable phone 1000, the display unit 1200 folded toward the main unit 1100 is rotated in a direction of an arrow in the figure to open the portable phone. In this case, the liquid crystal panel 1103 of the first liquid crystal display device 1101 displays an image and the first backlight 1104 is turned on. At this point, the liquid crystal display panel 1105 of the second liquid crystal display device 1102 displays an image, but the second backlight 1106 is turned off. Therefore, the user operates the keyboard 1109 of the main unit 1100 while viewing display on the first liquid crystal display device 1101.

Thereafter, when the user of the portable phone 1000 uses it in a folded form, the display unit 1200 is folded by being rotated in the direction opposite the arrow to overlie the main unit 1100 and simultaneously, the display on the liquid crystal panel 1103 of the first liquid crystal display device 1101 is terminated, and the first backlight 1104 also is turned off. Then, the second backlight 1106 is turned on while the display on the liquid crystal panel 1105 of the second liquid crystal display device 1102 is continued. Note that the second backlight 1106 is turned off after a few tens seconds. Moreover, the second backlight 1106 is turned on, for example, when an incoming call is received or keypads are pressed by the user.

However, a problem arises in that two liquid crystal display devices are incorporated in the above-described conventional portable phone, causing increase in power consumption. Furthermore, each of the two liquid crystal display devices utilizes only the polarized component of light from a backlight, i.e., only the light transmitting through the polarizer of each of the display devices, meaning that the light utilization ratio of liquid crystal display device is 50% at the maximum. Since such a backlight is incorporated within each of the liquid crystal display devices, 50% of light from the backlight is absorbed, in other words, consumed away by the polarizer of each of the liquid crystal display devices. That is, to achieve desired intensity of light, the portable phone as described above dissipates twice the power as a portable phone with single liquid crystal display device.

Additionally, since the portable phone is configured to dispose two liquid crystal display devices so that the rear surfaces of the display devices face each other, the thickness of the display unit is increased, disadvantageously decreasing portability of the phone. For example, in case of the portable phone 1000 shown in FIG. 13, the liquid crystal panel 1103 of the first liquid crystal display device 1101 would have a thickness of 1.5 mm and the first backlight 1104 would have a thickness of 1 mm, meaning that the those two components would have a thickness totaling 2.5 mm. Since the second liquid crystal display device 1102 has the same structure as the first liquid crystal display device 1101, the first and second liquid crystal display devices have approximately the same thickness and when the two liquid crystal display devices are assembled in superimposed relation with back to back each other, the thickness of those display devices unfavorably becomes equal to about 5 mm. Additionally, when other necessary components such as a support frame are mounted to those display devices, the portable phone becomes very thick.

As described above, the conventional liquid crystal display device capable of displaying images on both sides includes some problems. That is, 50% or more of light from the backlight is consumed away and therefore, the portable phone disadvantageously dissipates twice the power as a portable phone with a single display, and further, the display unit of electronic equipments incorporating therein such conventional liquid crystal display device becomes thick, decreasing the portability of electronic equipments.

DISCLOSURE OF THE INVENTION

The present invention has been conceived to solve the above-described problems and an aspect of the invention is to thin a liquid crystal display device, which is capable of displaying images on both sides, and increase the portability of electronic equipments that incorporate therein the display device, and further, increase the utilization ratio of light from a backlight to allow reduction in power consumption of the electronic equipments.

Accordingly, the present invention provides a liquid crystal display device constructed such that first and second liquid crystal panels, each consisting mainly of liquid crystal cells each of which has a liquid crystal layer sandwiched between two transparent substrates, are disposed back to back each other to enable the visual recognition of the first and second liquid crystal panels. The liquid crystal display device is constructed as follows.

That is, a light guide plate is disposed between the first liquid crystal panel and second liquid crystal panel, a light source is disposed adjacent at least one end surface of the light guide plate, and a polarization separator is disposed between the first liquid crystal panel and the light guide plate.

Furthermore, light emitted from the light guide plate is divided into two polarized lights by the polarization separator and one of the polarized lights is emitted toward the first liquid crystal panel, and the other of the polarized lights is emitted toward the second liquid crystal panel via the light guide plate.

Additionally, the liquid crystal display device may preferably be configured so that when the first liquid crystal panel and second liquid crystal panel each have polarizers on both sides of the liquid crystal cell, the polarization separator having a polarization transmission axis for transmitting one of linearly polarized lights whose polarizing directions are orthogonal to each other and a polarization reflection axis for reflecting the other of linearly polarized lights is disposed so that the polarization transmission axis is closely aligned with the polarization transmission axis of the polarizer, facing the polarization separator, of the first liquid crystal panel and the polarization reflection axis is closely aligned with the polarization transmission axis of the polarizer, facing the light guide plate, of the second liquid crystal panel.

Furthermore, the liquid crystal display device may also be configured so that a transfective reflector having no polarization capability is disposed between the second liquid crystal panel and the light guide plate, light emitted from the light guide plate is divided into two polarized lights by the polarization separator, one of the polarized lights is emitted toward the first liquid crystal panel, and the other of the polarized lights is emitted toward said second liquid crystal panel via the light guide plate and transflective reflector.

In such a case, the polarization separator may be disposed so that the reflection axis thereof is closely aligned with the polarization transmission axis of the polarizer, facing the transflective reflector, of the second liquid crystal panel.

The liquid crystal display device having the above configuration may be configured so that the light source is comprised of a plurality of light emitting elements and the number of light emitting elements activated at the time of display on the first liquid crystal panel and at the time of display on the second liquid crystal panel is made different from each other. In this case, it is preferred that a display area of the second liquid crystal panel is smaller than that of the first liquid crystal panel.

Still furthermore, the liquid crystal display device may be configured so that when display is performed by the first liquid crystal panel, all of the plurality of light emitting elements are allowed to emit lights and when display is performed by the second liquid crystal panel, only a specific number of the plurality of light emitting elements are allowed to emit lights to sufficiently illuminate the display area of the second liquid crystal panel.

Moreover, the liquid crystal display device may also be configured so that a first polarization separator is disposed between the first liquid crystal panel and the light guide plate, a second polarization separator is disposed between the second liquid crystal panel and the light guide plate, light emitted from the light guide plate is divided into two polarized lights by each of the first and second polarization separators, so that one of the polarized lights is emitted toward the side of the first liquid crystal panel and the other of the polarized lights is emitted toward the side of the second liquid crystal panel, the light source is comprised of a plurality of light emitting elements, and the number of light emitting elements activated at the time of display on the first liquid crystal panel and the number of light emitting elements activated at the time of display on the second liquid crystal panel are made different from each other.

In this case, it is preferred that the first polarization separator and second polarization separator have their polarization transmission axes orthogonal to each other, the polarization transmission axis of the first polarization separator is closely aligned with the polarization transmission axis of the polarizer, facing the first polarization separator, of the first liquid crystal panel, and the polarization transmission axis of the second polarization separator is closely aligned with the polarization transmission axis of the polarizer, facing the second polarization separator, of the second liquid crystal panel.

Furthermore, it is preferred that the display area of the second liquid crystal panel is made smaller than the display area of the first liquid crystal panel and when display is performed by the first liquid crystal panel, all of the plurality of light emitting elements are allowed to emit lights, and when display is performed by the second liquid crystal panel, only a specific number of the plurality of light emitting elements are allowed to emit lights to sufficiently illuminate the display area of the second liquid crystal panel.

BEST MODE FOR CARRYING OUT THE INVENTION

Hereinafter, preferred embodiments of the present invention will be explained in detail below with reference to the accompanying drawings.

First Embodiment: FIGS. 1 to 4

Figure 1:
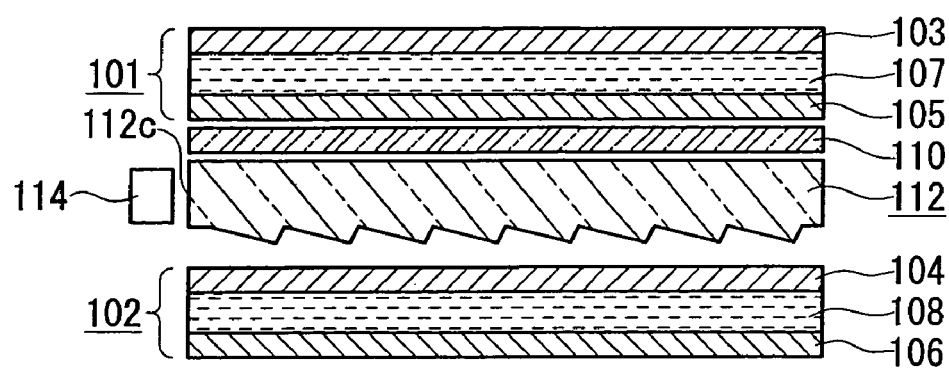
FIG. 1 is a schematic cross sectional view illustrating a first embodiment of a liquid crystal display device according to the invention.

FIG. 1 is a schematic cross sectional view illustrating a first embodiment of a liquid crystal display device according to the invention.

The liquid crystal display device shown in FIG. 1 has a first liquid crystal panel 101, polarization separator 110, light guide plate 112, and a second liquid crystal panel 102 arranged in this order from top to bottom in the figure. Accordingly, in this embodiment, the polarization separator 110 is provided only between the first liquid crystal panel 101 and the light guide plate 112, and no component is provided between the second liquid crystal panel 102 and the light guide plate 112.

The first liquid crystal panel 101 includes a first liquid crystal cell 107 having a liquid crystal layer sandwiched between two glass substrates, a first polarizer 103 disposed on a viewing side "A", and a second polarizer 105 disposed on a side opposite the viewing side "A". Furthermore, though not shown, the first liquid crystal cell 107 has a transflective layer provided therein for transmitting a part of light incident thereon and reflecting the remaining part of the light, thereby constituting a transflective liquid crystal cell.

Furthermore, the second liquid crystal panel 102 includes a second liquid crystal cell 108 having a liquid crystal layer sandwiched between two glass substrates, a third polarizer 104 disposed on the side of the light guide plate 112, and a fourth polarizer 106 disposed on a viewing side "B". Moreover, a light source 114 is disposed adjacent one end surface 112c of the light guide plate 112.

Subsequently, individual components of the device will be explained in detail. The first to fourth polarizers are implemented by an absorption-type polarizer. The absorption-type polarizer is a typical polarizer prepared by staining a stretched film with iodine or dichroic dye and has a polarization transmission axis and an absorption axis orthogonal to each other, and transmits light whose polarizing direction is parallel to the polarization transmission axis and absorbs light whose polarizing direction is parallel to the absorption axis.

The first liquid crystal panel 101 is configured so that the polarization transmission axes of the first polarizer 103 and second polarizer 105 are adjusted to allow the panel to perform white display when no voltage is applied to the first liquid crystal cell 107 and then those polarizers are attached to the first liquid crystal cell 107. That is, the first liquid crystal panel 101 is configured to operate in the normally white mode. Moreover, the first liquid crystal panel 101 is a tranflective liquid crystal panel having a transflective layer provided within the first liquid crystal cell 107.

Likewise, the second liquid crystal panel 102 is configured so that the polarization transmission axes of the third polarizer 104 and fourth polarizer 106 are adjusted to allow the panel to perform white display when no voltage is applied to the second liquid crystal cell 108 and then those polarizers are attached to the second liquid crystal cell 108. That is, the second liquid crystal panel 102 is configured to operate in the normally white mode.

Thereafter, the polarization separator 110 disposed between the first liquid crystal panel 101 and second liquid crystal panel 102 will be explained. The polarization separator 110 serves to divide light incident thereon into two polarized components. Examples of such polarization separators include a polarization separator configured so that a circularly polarized component is split by a cholestric liquid crystal into a right-handed circularly polarized component and a left-handed circularly polarized component and then those right-handed and left-handed circularly polarized components each are converted to a linearly polarized component by a ¼ wavelength plate, and a polarization separator configured so that thin films with refractive indexes different from one another are laminated to form a polarization separator for dividing a linearly polarized component into two linearly polarized components orthogonal to each other. The embodiment employs the latter polarization separator. The polarization separator 110 has a polarization transmission axis for transmitting one of linearly polarized components of incident light whose polarizing directions are orthogonal to each other and a reflection axis for reflecting the other of linearly polarized components.

Then, how the second polarizer 105, the polarization separator 110 and the third polarizer 104, all of which are critical components for implementing the invention, are optically arranged will be explained in detail.

Figure 3:
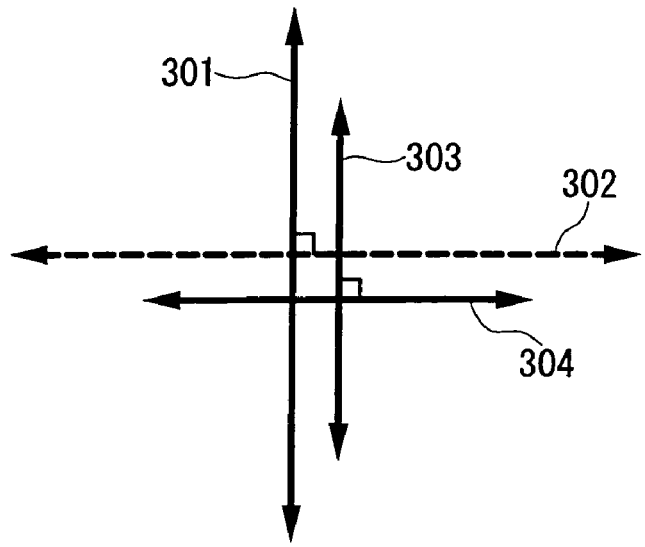
FIG. 3 is an explanatory diagram illustrating a positional relationship between the individual polarization axes of second, third polarizers and polarization separator of FIG. 1.

FIG. 3 illustrates a positional relationship between the polarization axes of the individual polarizers and the polarization separator. In FIG. 3, individual arrows indicate the corresponding polarization axes and a solid line represents a polarization transmission axis, and a broken line represents a polarization reflection axis.

As previously described, a polarization transmission axis 301 and a polarization reflection axis 302 of the polarization separator 110 are orthogonal to each other. A polarization transmission axis 303 of the second polarizer 105 is aligned parallel to the polarization transmission axis 301 of the polarization separator 110. A polarization transmission axis 304 of the third polarizer 104 is aligned parallel to the polarization reflection axis 302 of the polarization separator 110. In this case, the polarization transmission axis 303 of the second polarizer 105 and the polarization transmission axis 304 of the third polarizer 104 are aligned orthogonal to each other.

The second polarizer 105, third polarizer 104 and polarization separator 110 are arranged as described above. In this case, the first polarizer 103 and fourth polarizer 106 are arranged to allow the individual liquid crystal panels 101, 102 to operate in the normally white mode.

Subsequently, the light guide plate 112 will be explained with reference to FIG. 2. The light guide plate 112 is made of a non-colored and transparent acrylic material having a thickness of 0.7 mm. A front surface 112a is planar and prisms 112b are formed on a rear surface, and the light guide plate operates so that light totally reflected by the front surface 112a and guided within the plate is reflected by the prism 112b and exits the front surface 112a. The prisms 112b are formed in the shape of triangular mountains having a height of 20 µm and arranged at a pitch of 300 µm.

Figure 2:
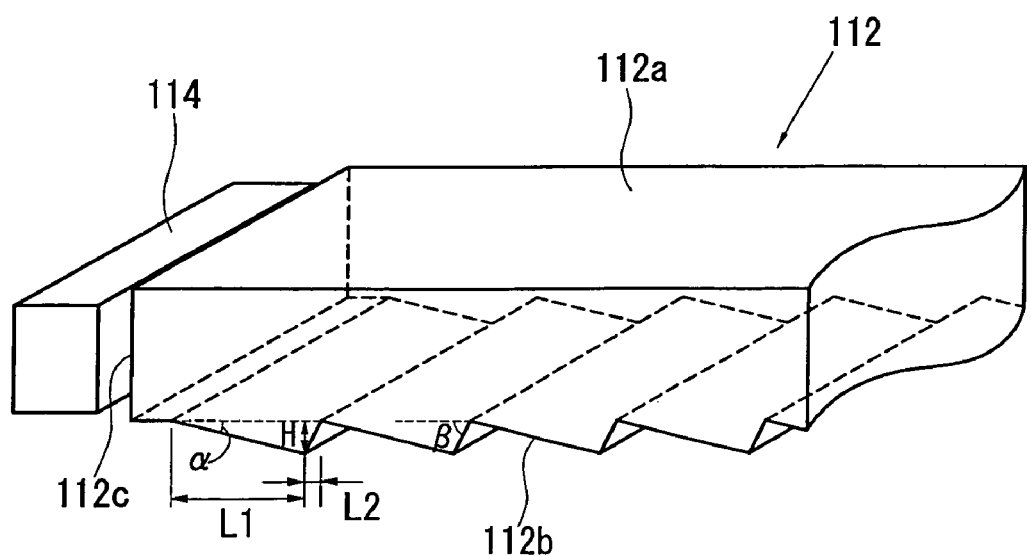
FIG. 2 is an enlarged partial perspective view illustrating a light source and a light guide plate of FIG. 1.

Referring to FIG. 2, an upwardly inclined plane beginning with the side of the light source 114 and inclined at an angle α of 4.6° is formed extending a distance of L1=245 µm, and a downwardly inclined plane beginning with the point at which the upwardly inclined plane is terminated and inclined at an angle β of 20° is formed extending a distance of L2=55 µm. In this case, the prism 112b has a height H of 20 µm. The prism 112b is repeated at a pitch of 0.3 mm in the longitudinal direction of the light guide plate 112. Those prisms are formed using an injection molding process to ensure that occurrence of optical distortion is avoided as possible.

The light source 114 is disposed so as to be close to one (positioned on the side of a lower portion of the longer inclined plane of the prism 112b) end surface 112c of the light guide plate 112 in the longitudinal direction thereof. In the embodiment, a white LED array is employed as the light source 114. The light source 114 is not limited thereto, but may be implemented by a cold-cathode tube. Any linear light source may be employed which is capable of emitting light with a relatively uniform distribution of illumination intensity to the one end surface 112c of the light guide plate 112.

Subsequently, how the liquid crystal display device performs a display function will be explained with reference to FIG. 4 as an explanatory diagram illustrating a schematic cross section of the device.

Figure 4:
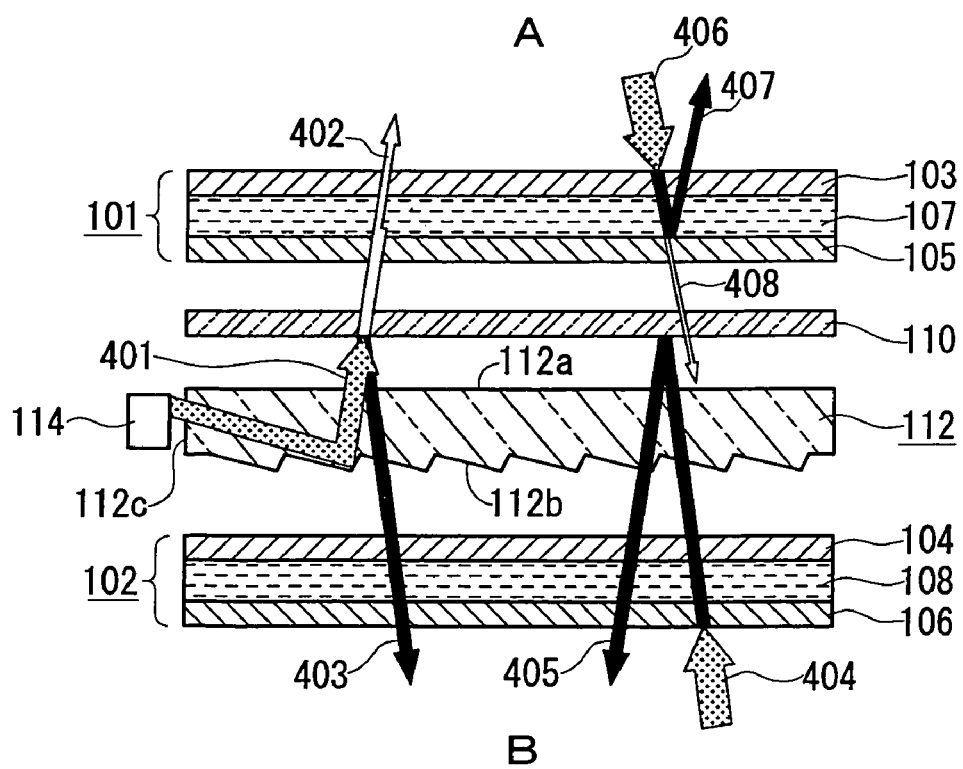
FIG. 4 is an explanatory diagram illustrating a schematic cross section to explain how the liquid crystal display device of FIG. 1 performs a display function.

In FIG. 4, a light flux 401 represents a portion of light fluxes emitted from the light source 114 and its travel path. A light flux 402 represents a portion of the light flux 401 and the relative amount of light flux transmitting through the polarization separator 110, and its travel path. A light flux 403 represents a portion of the light flux 401 and the relative amount of light flux reflected by the polarization separator 110, and its travel path. Light fluxes 406, 404 represent a portion of external lights incoming from a viewing side "A" and viewing side "B", respectively. A light flux 407 represents a portion of the light flux 406 and the relative amount of light flux reflected by the transflective layer within the first liquid crystal panel 101 and exiting to the viewing side "A", and its travel path. A light flux 408 represents a portion of the light flux 406 and the relative amount of light flux transmitting through the transflective layer within the first liquid crystal panel 101 and exiting to the side of the polarization separator 110, and its travel path. A light flux 405 represents a portion of the light flux 404 and the relative amount of light flux transmitting through the second liquid crystal panel 102 and its travel path.

It should be noted that arrows, representing the individual light fluxes, of FIG. 4 mean that an arrow with dots indicates a non-polarized light, a white arrow indicates only a linearly polarized light component vertical to the paper, and a black arrow indicates only a linearly polarized light component parallel to the paper.

First, how a display function is performed when the light source 114 is turned on will be explained. The light flux 401 emitted from the light source 114 enters the light guide plate 112 and is guided within the light guide plate 112 while being totally reflected. When the light flux is guided along a light path and impinges on the short side of the prism, the light flux totally reflected by the short side exits to the side of the first liquid crystal panel 101. The light flux 401 is a light flux maintaining its original non-polarized state of when it is emitted from the light source 114. The light flux 401 exiting the light guide plate 112 enters the polarization separator 110 and the light flux 402 having a polarized component parallel to the polarization transmission axis 301 of the polarization separator 110 transmits through the separator 110. On the other hand, the light flux 403 having a polarized component parallel to the polarization reflection axis 302 of the polarization separator 110 is reflected by the separator and again enters the light guide plate 112.

Since the polarization transmission axis 303 of the second polarizer 105 is parallel to the polarization transmission axis 301 of the polarization separator 110 as shown in FIG. 3, the light flux 402 transmits through the second polarizer 105. Furthermore, a portion of the light flux 402 transmits through the transflective layer formed within the liquid crystal cell 107. As previously explained, the first liquid crystal panel 101 is configured to operate in the normally white mode and therefore the light flux 402 exits to the viewing side "A" without experiencing a change.

At this point, since an observer on the viewing side "A" views the light flux 402, the liquid crystal display device is able to perform image display by using the light flux 402 as a light source and controlling a voltage applied to the first liquid crystal panel 101.

On the other hand, the light flux 403 reflected by the polarization separator 110 again enters the light guide plate 112 and exits the light guide plate 112 without neither being absorbed, reflected nor scattered while maintaining its linearly polarized state because the light guide plate 112 is made of a thin acrylic plate with high transparency. Thereafter, the light flux 403 enters the polarizer 104. As can be seen from FIG. 3, the polarization transmission axis 304 of the third polarizer 104 is parallel to the polarization reflection axis 302 of the polarization separator 110 and therefore the light flux 403 also transmits through the polarizer 104. Note that since the second liquid crystal panel 102 is also configured to operate in the normally white mode, the light flux 403 exits to the viewing side "B" without experiencing a change.

At this point, when an observer on the viewing side "B" views the light flux 402, the liquid crystal display device is able to perform image display by using the light flux 403 as a light source and controlling a voltage applied to the second liquid crystal panel 102.

Subsequently, how a display function is performed when the light source 114 is not turned on will be explained. The light flux 404 as external light incident from the viewing side "B" travels so that only a polarized component parallel to the polarization transmission axis 304 of the fourth polarizer 106 transmits through the polarizer 106 and also transmits through the third polarizer 104 because the second liquid crystal panel operates in the normally white mode, and enters the light guide plate 112. Since the light guide plate 112 is a transparent substrate, the above-stated polarized component of the light flux 404 transmits through the plate while maintaining its linearly polarized state and enters the polarization separator 110. At this point, since a direction in which the light flux 405 is linearly polarized coincides with the polarization reflection axis 302 of the polarization separator 110, the light flux 405 is reflected by the polarization separator 110 and again transmits through the light guide plate 112 and second liquid crystal panel 102, and exits to the viewing side "B".

Thus, at this point, an observer on the viewing side "B" is able to view external light incident from the viewing side "B" and then reflected by the separator, and therefore, the liquid crystal display device is able to perform image display by controlling a voltage applied to the second liquid crystal panel 102.

The light flux 406 as external light incident from the viewing side "A" travels so that only a polarized component parallel to the polarization transmission axis 303 of the first polarizer 103 transmits through the polarizer 103 and is reflected by the transflective layer formed within the liquid crystal cell 107, thereby forming a light flux 407, and again transmits through the first polarizer 103 and exits to the viewing side "A". Note that a light flux 408, a part of the light flux 406, transmits through the transflective layer formed within the liquid crystal cell 107 and has its polarized direction rotated 90 degrees by the liquid crystal layer, and also transmits through the second polarizer 105.

Thus, at this point, an observer on the viewing side "A" is able to view external light incident from the viewing side "A" and then reflected by the transflective layer, and therefore, the liquid crystal display device is able to perform image display by controlling a voltage applied to the first liquid crystal panel 101.

As described above, the liquid crystal display device of the embodiment is able to perform image display by using any one of light from the light source 114 and external lights from the viewing sides "A" and "B". In this case, it should be understood that as shown in FIG. 4, the light flux 401 from the light source 114 is divided into two polarized light components by the polarization separator 110 and the individual polarized light components serve as illumination light without experiencing loss to illuminate the first and second liquid crystal panels. This allows the light source 114 to illuminate the two liquid crystal panels disposed on both sides of the device. Furthermore, the amounts of lights utilized by the two liquid crystal panels 101, 102 each are 50% of the amount of light from the light source 114, meaning that the liquid crystal display device of the embodiment is capable of utilizing 100% of the amount of light from the light source 114.

Moreover, when the device performs display function using external lights, an observer views the liquid crystal display device of the embodiment from the viewing side "A", how light travels after its entrance into the liquid crystal panel is completely the same as would be observed in a conventional tranflective liquid crystal panel, thereby allowing the observer to recognize an image to be displayed on the panel in the same fashion. When an observer views the device of the embodiment from the viewing side "B," the liquid crystal panel of the embodiment is able to provide brighter display than the conventional tranflective liquid crystal panel. The reason for this is that the conventional tranflective liquid crystal panel has a semi-transmissive plate provided therein, however the liquid crystal panel of the embodiment does not include a semi-transmissive plate and therefore about half of the external light flux 404 enters the panel, and is totally reflected by the polarization separator 110 and returns back to the viewing side "B". Accordingly, light reflectance upon reflection of light becomes high, allowing the liquid crystal panel of the embodiment to provide brighter display. Also upon transmission of light, since a semi-transmissive plate is not present within the panel, brighter transmission light than would be in the conventional tranflective liquid crystal panel can be obtained.

Additionally, although the embodiment employs a tranflective liquid crystal panel as the first liquid crystal panel 101, instead, it may employ a transmissive liquid crystal panel. As long as a relationship between the polarized components divided by the polarization separator 110 and the third polarizer 105 and fourth polarizer 104 is satisfied, any type of liquid crystal panel can be employed in the liquid crystal display device of the invention. Moreover, it is also apparent that irrespective of passive matrix drive or active matrix drive, any type of drive method for liquid crystal panel can be applied to the liquid crystal panel of the embodiment. Furthermore, although explanation has been made of the normally white mode as a display mode, the normally black mode may also be applied to the embodiment.

Figure 5:
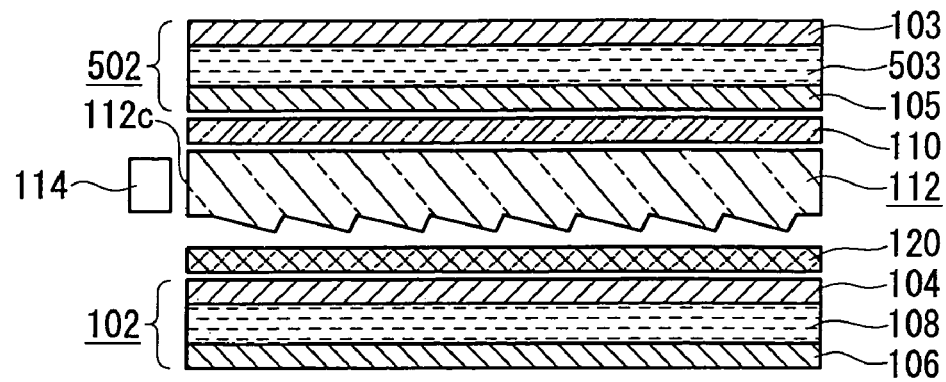
FIG. 5 is a schematic cross sectional view illustrating a second embodiment of the liquid crystal display device according to the invention.
Figure 6:
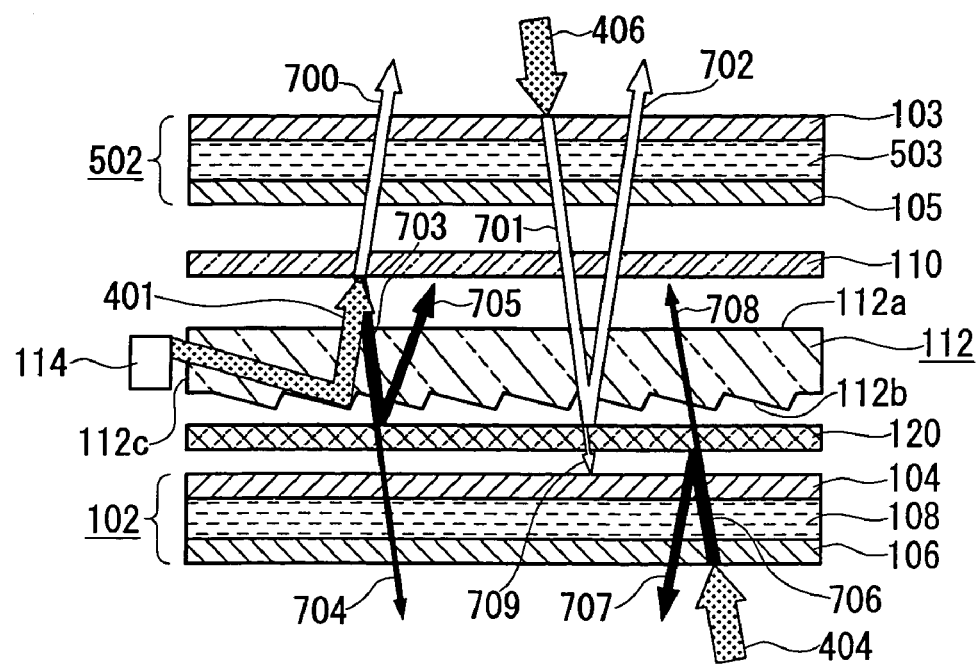
FIG. 6 is a schematic cross sectional view to explain how the liquid crystal display device of FIG. 5 performs a display function.

Second Embodiment: FIGS. 5 and 6

Thereafter, a second embodiment of the liquid crystal display device according to the invention will be explained. FIG. 5 is a schematic cross sectional view of the liquid crystal display device and FIG. 6 is a schematic cross sectional view to explain how the liquid crystal display device performs a display function.

The second embodiment is different from the first embodiment in that a transflective reflector 120 is disposed between a light guide plate 112 and a liquid crystal panel 102, and a transflective layer is not provided within a first liquid crystal panel 502. The configuration other than the above-mentioned configuration and display theory are approximately the same as those explained in the description of the first embodiment. The second embodiment will be explained in detail below.

Referring to FIG. 5, the transflective reflector 120 is disposed between the light guide plate 112 and the second liquid crystal panel 102. The transflective reflector 120 is an optical element like a half mirror that has no polarizing capability and serves to transmit a portion of light incident thereon and reflect the remainder of the light. For example, 20 to 40% of incident light is allowed to transmit and 60 to 80% of incident light is reflected.

Furthermore, a first liquid crystal cell 503 constituting the first liquid crystal panel 502 is a transmissive liquid crystal cell having no transflective layer. The configuration other than the above-stated configuration is the same as that shown in FIG. 1 and therefore detailed explanation thereof is omitted.

A positional relationship, employed in the liquid crystal display device, between individual polarization axes of a second polarizer 105, polarization separator 110 and third polarizer 104 is the same as that explained in the description of the first embodiment shown in FIG. 3. Moreover, the individual polarizers 103, 105, 104 and 106 are disposed so as to allow the first and second liquid crystal panels 502, 102 to operate in the normally white mode.

Subsequently, how the liquid crystal display device performs a display function will be explained with reference to FIG. 6. Arrows, representing individual light fluxes, of FIG. 6 also mean that an arrow with dots indicates a non-polarized light, a white arrow indicates only a linearly polarized light component vertical to the paper, and a black arrow indicates only a linearly polarized light component parallel to the paper.

In FIG. 6, a light flux 701 represents the relative amount of light flux transmitting through the first liquid crystal panel 502 and the polarization separator 110 and its travel path when the light flux 406 as external light incident from the viewing side "A" enters the panel 502. A light flux 702 represents a light flux after the light flux 701 is reflected by the polarization separator 110 and the relative amount of light flux reflected and then exiting to the viewing side "A", and its travel path. A light flux 709 represents the relative amount of light flux transmitting through the transflective reflector 120 and its travel path.

A light flux 703 is produced so that a light flux from a light source 114 enters the light guide plate 112, is totally reflected by the plate, reaches the polarization separator 110, and is reflected by the separator. A light flux 704 represents a portion of the light flux 703 and the relative amount of light flux transmitting through the transflective reflector 120, and its travel path. A light flux 705 represents a portion of the light flux 703 and the relative amount of light flux reflected by the transflective reflector 120, and its travel path.

A light flux 706 represents the relative amount of light flux that is produced after a portion of an external light flux 404 incident from the viewing side "B" transmits through the second liquid crystal panel 102. A light flux 707 represents the relative amount of light flux that is produced after a portion of the light flux 706 is reflected by the transflective reflector 120 and then exits to the viewing side "B", and its travel path. A light flux 708 represents the relative amount of light flux that is produced after a portion of the light flux 706 transmits through the transflective reflector 120, and its travel path.

A light flux 700, a portion of the light flux 401, having a linearly polarized light component parallel to the polarization transmission axis 301 (refer to FIG. 3) of the polarization separator 110 transmits through it and also through the second polarizer 105. Then, the light flux 700 exits to the viewing side "A" without reducing its magnitude because no transflective layer is present within the first liquid crystal cell 503 in the present embodiment. On the other hand, the light flux 703 having a linearly polarized light component parallel to the polarization reflection axis 302 (refer to FIG. 3) of the polarization separator 110 is reflected by it and again transmits through the light guide plate 112, and enters the transflective reflector 120. At this point, a portion of the linearly polarized component of the light flux 703 transmits through the transflective reflector 120, producing the light flux 704 which enters the third polarizer 104.

As can be seen from FIG. 3, the polarization transmission axis 304 of the third polarizer 104 and the polarization reflection axis 302 of the polarization separator 110 are parallel to each other and therefore the light flux 704 transmits through the polarizer 104. Note that since the second liquid crystal panel 102 operates in the normally white mode, the light flux 704 exits to the viewing side "B" without experiencing a change. The light flux 705 reflected by the transflective reflector 120 also is nearly totally reflected by the polarization separator 110 and is again returned back to the transflective reflector 120, and a portion of the returned light flux transmits through the reflector and the remainder of the returned light flux is reflected by the reflector, and the aforementioned operation is repeated, allowing almost all amount of light flux 705 to exit to the viewing side "B." Accordingly, at this point, the liquid crystal display device is able to perform image display by using light emitted from the light source 114 and controlling a voltage applied to the second liquid crystal panel 102.

The light flux 404 incident as external light from the viewing side "B" travels so that only the component, polarized by the fourth polarizer 106, of the light flux transmits through the polarizer 106, producing a light flux 706, and the light flux 706 transmits also through the third polarizer 104 because the second liquid crystal panel operates in the normally white mode and enters the transflective reflector 120. At this point, a light flux 708, a portion of the light flux 706, transmits through the transflective reflector 120, but almost all of the light flux 706 is reflected by the reflector, producing a light flux 707, and the light flux 707 again enters the second liquid crystal panel 102 and exits to the viewing side "B."

Accordingly, at this point, an observer on the viewing side "B" views the reflected component of external light incident from the viewing side "B" and therefore the liquid crystal display device is able to perform image display by controlling a voltage applied to the second liquid crystal panel 102.

The light flux 406 incident as external light from the viewing side "A" transmits through the first polarizer 103, producing the light flux 701, and the light flux 701 transmits also through the second polarizer 105 because the first liquid crystal panel operates in the normally white mode and enters the polarization separator 110. At this point, the polarization transmission axis 301 (refer to FIG. 3) of the polarization separator 110 and the polarization direction of the light flux 701 are parallel to each other, and therefore, the light flux 701 transmits also through the polarization separator 110 and enters the light guide plate 112. Since the light guide plate 112 is a transparent substrate, the light flux 701 transmits through the plate while maintaining its linearly polarized state and enters the transflective reflector 120.

At this point, a portion of the light flux 701 transmits through the transflective reflector 120, producing the light flux 709, but since the light flux 709 is linearly polarized light parallel to the absorption axis of the third polarizer 104 of the second liquid crystal panel 102, almost all of the light flux 709 is absorbed by the polarizer 104. Then, almost all of the light flux 701 is reflected by the transflective reflector 120, producing a light flux 702, and the light flux 702 again transmits through the polarization separator 110 and the first liquid crystal panel 502, and exits to the viewing side "A." Therefore, an observer on the viewing side "A" views the reflected component of external light incident from the viewing side "A" and accordingly, the liquid crystal display device is able to perform image display by controlling a voltage applied to the first liquid crystal panel 502.

As described above, in the present embodiment, the liquid crystal display device is able to perform image display by using any one of light from the light source 114 and the external light flux 406 from the viewing side "A" and the external light flux 404 from the viewing sides "B." In this case, it should be understood that as shown in FIG. 6, the light flux 401 from the light source 114 is divided into two polarized components by the polarization separator 110 and the individual polarized components serve as a light source without experiencing loss to illuminate the first and second liquid crystal panels 502, 102. This allows the light source 114 to illuminate the two liquid crystal panels disposed on both sides of the device.

When the device performs a display function using external light, an observer on the viewing side "A" views an image on the panel utilizing a light flux reflected by the transflective reflector 120 disposed with the interposition of the light guide plate 112, which operation is different from that performed when the conventional tranflective liquid crystal panel is used. Accordingly, the liquid crystal display device of the embodiment allows display with high reflectance and brightness upon reflection of light.

Furthermore, instead of the transflective reflector 120 and polarizer 104, a slightly transmissive absorber and reflection-type polarizer may be disposed. For example, TDF (trademark) available from 3M company has a transrucent absorber and reflection-type polarizer integrated therein and therefore, instead of the transflective reflector 120 and polarizer 104, TDF can be disposed as it is in the positions of the transflective reflector 120 and polarizer 104. In this case, similarly to the embodiment, the transmission axes of the transrucent absorber and reflection-type polarizer are aligned with the transmission axis of the first polarization separator 110. Moreover, when an observer views display utilizing the light flux 406 as external light incident from the viewing side "A", the amount of light flux 702 is reduced and therefore, when a liquid crystal panel incorporating therein a transflective layer and employed in the first embodiment is employed as the first liquid crystal panel 502, high visibility of an image to be displayed can be achieved.

It should be noted that when a liquid crystal display device is configured as described above, the third polarizer 104 (absorption-type polarizer) need not be provided on the upper side of the second liquid crystal panel 102.

Also in those embodiments, any type of liquid crystal panel can be employed in the liquid crystal display device and it is apparent that irrespective of passive matrix drive or active matrix drive, any type of drive method for liquid crystal panel can be applied to the liquid crystal panel. Furthermore, explanation has been made of the normally white mode as a display mode, the normally black mode may also be applied to the embodiments.

Figure 7:
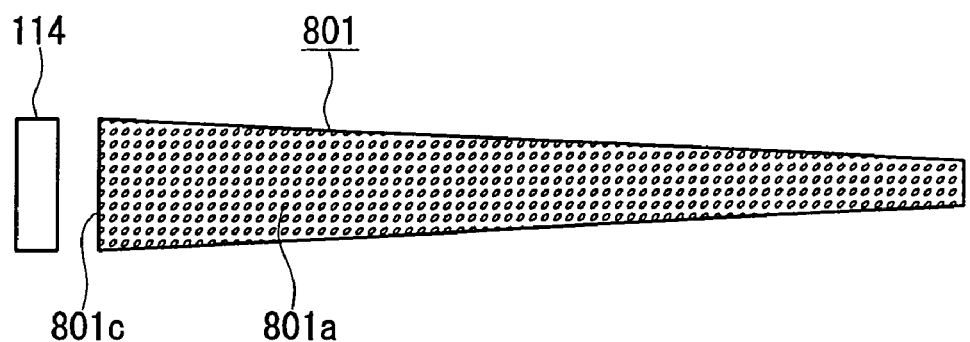
FIG. 7 is a side view illustrating only the light guide plate and light source used in a third embodiment of the liquid crystal display device according to the invention.
Figure 8:
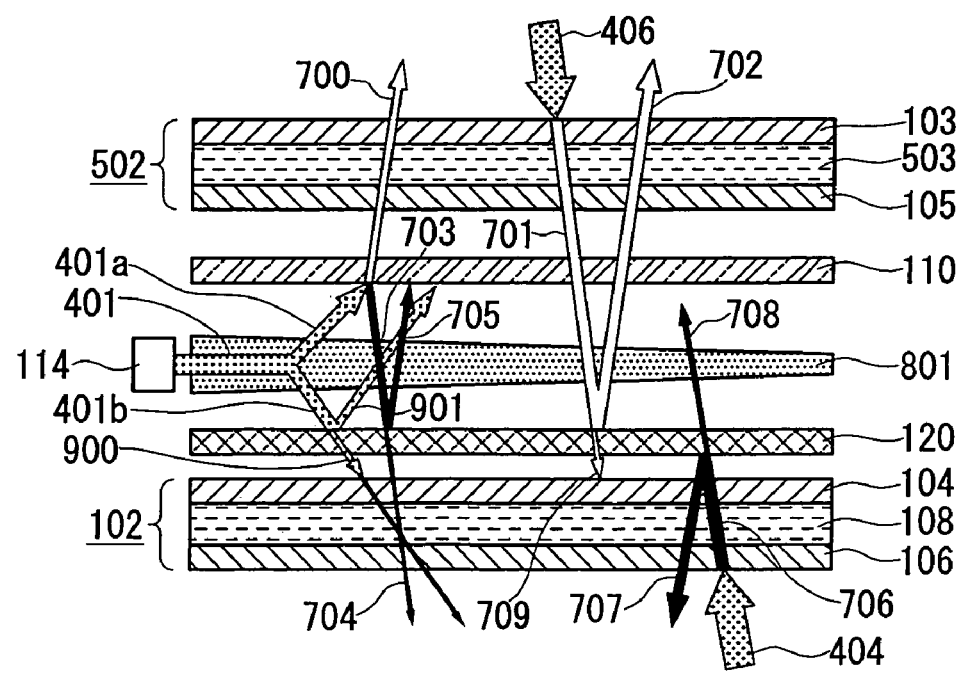
FIG. 8 is a schematic cross sectional view to explain how the liquid crystal display device of the third embodiment according to the invention performs a display function.

Third Embodiment: FIGS. 7 and 8

Thereafter, a third embodiment of the liquid crystal display device according to the invention will be explained. FIG. 7 is a side view of a light guide plate and light source of the liquid crystal display device, and FIG. 8 is a schematic cross sectional view to explain how the liquid crystal display device performs a display function.

The third embodiment is different from the above-described second embodiment only in the configuration of a light guide plate. In the first and second embodiments, a light guide plate including prisms arranged on one surface of an acrylic plate to have a height of several micrometers and a constant pitch has been used. Such a light guide plate generally needs to be manufactured with high processing accuracy. In the third embodiment, a light guide plate that is generally said to allow facilitated manufacture, increase in yield and simplified processing is employed.

As shown in FIG. 7, a light guide plate 801 is made of acrylic material having light-scattering capability due to beads dispersed therein and the acrylic material is shaped into a thin wedge. Similarly to the aforementioned individual embodiments, an LED array is employed as a light source 114 and light emitted from the light source is incident from one end surface 801c positioned on the thicker side of the light guide plate 801 in the longitudinal direction thereof. The light guide plate 801 is characterized in that while a light flux incident from the light source is guided along the plate, the light flux is affected by a difference between refractive indexes of the beads 801a and the acrylic material, and then scattered, and finally exits to both upper and lower sides. lower sides.

The liquid crystal display device of the embodiment is configured by only replacing the light guide plate 112 of FIG. 5 with the light guide plate 801 of FIG. 7 and therefore explanation of the configuration thereof is omitted.

How the liquid crystal display device performs a display function will be explained with reference to FIG. 8. The reason why individual arrows of FIG. 8 are drawn in different forms is the same as that explained in the description of the arrows shown in FIG. 4.

The light guide plate 801 of FIG. 8 allows light from the light source 114 to enter through one end surface 801c of the plate and exit to both upper and lower sides of the plate, as previously described, while being guided in a direction toward the other end surface. That is, the light flux 401 incident from the light source 114 is scattered, producing light fluxes 401a, 401b, and the light flux 401a exits in a direction toward the polarization separator 110, and simultaneously the light flux 401b exits also in a direction toward a transflective reflector 120. At this point, similarly to the second embodiment, the light flux 401a serves to illuminate the two liquid crystal panels. On the other hand, the light flux 401b travels so that a light flux 900, a portion of the light flux 401b, transmits through the transflective reflector 120, serving as illumination light for the second liquid crystal panel 102. A light flux 901 reflected by the transflective reflector 120 again returns back to the light guide plate 801. When the light flux 901 transmits through the light guide plate 801 and enters the polarization separator 110, the linearly polarized light component, parallel to the polarization transmission axis of the separator, of the light flux 901 transmits through the separator, serving as illumination light for the first liquid crystal panel 502, and the linearly polarized light component, parallel to the reflection axis of the separator, of the light flux 901 is reflected by the separator and again transmits through the light guide plate 801, and is returned back to the transflective reflector 120. While this operation is repeated, the component, parallel to the transmission axis of the polarization separator 110 or the polarization axis of a third polarizer 104, of the light flux 901 transmits through the polarization separator 110 or the third polarizer 104, serving as illumination light for the first liquid crystal panel 502 or the second liquid crystal panel 102.

As described above, either the light flux 401a or 401b exiting the upper or lower surface of the light guide plate 801 is never absorbed and both light fluxes are utilized as illumination light for the two liquid crystal panels 502 and 102. How the display device of the embodiment operates when the light flux 406 as external light from the viewing side "A" and the light flux 404 as external light from the viewing side "B" are incident on the device is the same as that explained in the description of the display device of the second embodiment and therefore explanation thereof is omitted.

It should be appreciated that the embodiment employs an acrylic material with inclusion of beads as a material for the light guide plate 801, but a material to be employed in the embodiment is not limited to such an acrylic material. Almost all types of generally available light guide plates can be used as they are as the light guide plate 801 of the embodiment. For example, a light guide plate formed by embossing of both surfaces or one surface of a transparent plate to scatter light incident thereon or by printing of a printing material in the form of wedge to compensate for variations in light intensity can be used as it is.

Figure 9:
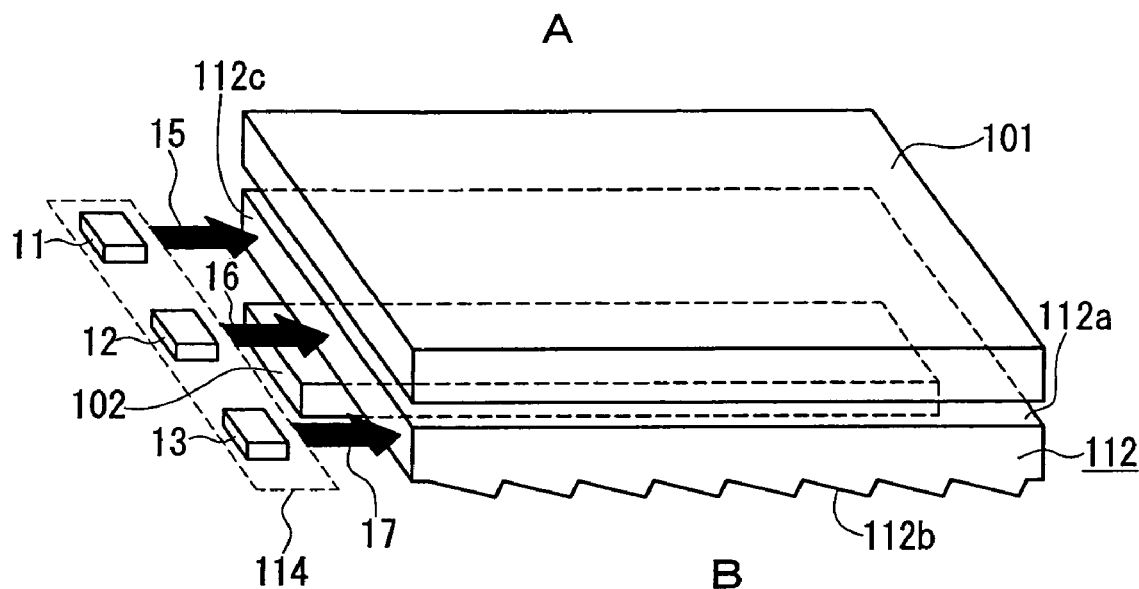
FIG. 9 is a perspective view of the general configuration of a fourth embodiment of the liquid crystal display device according to the invention, omitting illustration of a polarization separator and/or a transflective reflector.

Fourth Embodiment: FIG. 9

Thereafter, a fourth embodiment of the liquid crystal display device according to the invention will be explained. FIG. 9 is a perspective view of the general configuration of the liquid crystal display device, omitting illustration of a polarization separator and/or a transflective reflector.

The essential configuration of the fourth embodiment would be the same as any one of the configurations of the first to third embodiments, however, herein is explained as having the same configuration of the first embodiment.

The liquid crystal display device of the embodiment is different from that of the first embodiment only in that the size (in this case, the width thereof) of a second liquid crystal panel 102 is smaller than that of a first liquid crystal panel. Thus, the display area of the second liquid crystal panel 102 is smaller than the display area of the first liquid crystal panel 101.

Figure 13:
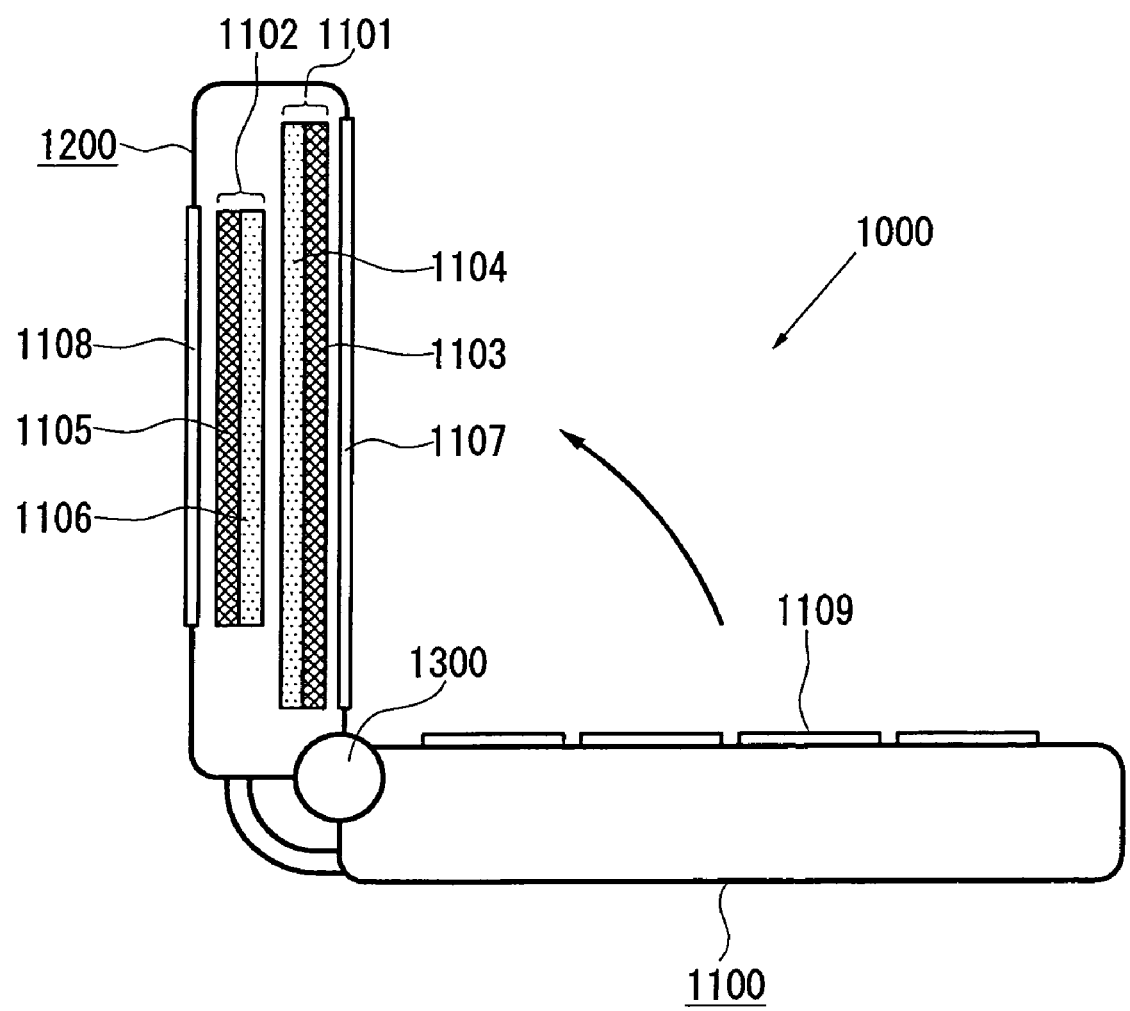
FIG. 13 is a schematic cross sectional view illustrating the exemplary configuration of a portable phone incorporating therein a conventional liquid crystal display device for both-sided display.

In this case, since the second liquid crystal panel 102 is used as an auxiliary panel for the first liquid crystal panel 101 (as is the case with the liquid crystal display device explained in the description of the conventional technique of FIG. 13), it could often be made relatively small. Therefore, in the first embodiment, since the light source 114 is designed to illuminate the panels so that the display area of the first liquid crystal panel having greater display area than the second liquid crystal panel receives a sufficient amount of light, a large amount of light to be used to perform display on the second liquid crystal panel having smaller display area is wasted. Since the second liquid crystal panel 102 is used as an auxiliary panel, it also needs to be designed to further reduce its power consumption.

In consideration of such requirement, the embodiment is configured so that an unnecessary portion of a light source is turned off to reduce wasted power.

Referring to FIG. 9, the same tranflective liquid crystal panel as that employed in the first embodiment is employed as a first liquid crystal panel 101 in the embodiment. A second liquid crystal panel 102 has the same configuration as that in the first embodiment, however has a different area than that in the first embodiment. That is, the major side of the second liquid crystal panel 102 is the same as that of the first liquid crystal panel 101, however the short side thereof is one-third as that of the first liquid crystal panel 101, causing the second liquid crystal panel to have a long and narrow shape. The second liquid crystal panel 102 serving as an auxiliary panel is comprised of about 10×100 dots of pixels, and is primarily used to inform a user of current time and brief information. The light source 114 disposed closely to an end surface 112c of the light guide plate 112 is comprised of three light-emitting elements, i.e., Light Emitting Diodes (LEDs) 11, 12, 13 in the embodiment. Light fluxes 15 to 17 represent light fluxes emitted from the individual LEDs and entering to the light guide plate 112.

Referring to FIG. 9, when an observer views the first liquid crystal panel 101 from a viewing side "A", all of the LEDs 11 to 13 of the light source 114 are turned on. At this point, the light guide plate 112 operates so that all the light fluxes are input through the end surface 112c of the plate, guided within the entire plate, propagate along the travel path, and exit the guide plate as explained in the description of the light flux 401 of FIG. 4, serving as illumination light for the first liquid crystal panel 101, as indicated by the light flux 402 of FIG. 4.

Then, when an observer views the second liquid crystal panel 102 from a viewing side "B", the LEDs 11 and 13 out of the three LEDs disposed on both end sides of the light source 114 are turned off and only the LED 12 is turned on. At this point, only the light flux 16 out of the light fluxes 15 to 17 shown in FIG. 9 to be emitted from the individual LEDs exits the light source and enters the light guide plate 112. Within the light guide plate 112, the light flux incident thereon propagates along the travel path indicated by the light flux 401 shown in FIG. 4 and exits the guide plate. Note that the light flux 401 is present only within the illumination range covered by the LED 12. Referring to FIG. 9, the range corresponding to one-third of the total width of the light guide plate 112 and determined by reference to the central portion of the guide plate, i.e., about one-third of the whole area of the guide plate is to be illuminated. Since the light guide plate 112 is made of a transparent material, incident light travels relatively straight and therefore a portion of the light guide plate corresponding to the one-third of the total width thereof can be uniformly illuminated.

As is already explained in the description of FIG. 4, the light flux 401 is reflected by the polarization separator 110, producing the light flux 403 which serves as illumination light for the second liquid crystal panel 102. At this point, since the second liquid crystal panel 102 is disposed in the central portion of a screen, nearly the entire area of the panel 102 is uniformly illuminated and therefore an observer on the viewing side "B" is able to obtain a bright display level of an image to be displayed. In this case, since one out of the three LEDs is being turned on, power consumption is reduced to one-third of that in the case of turning on of all of the three LEDs.

The embodiment employs three LEDs, but is not limited to employment of three LEDs. The number of LEDs would be determined so that an optimal number of LEDs illuminate individual liquid crystal panels each having an optional display area to allow all the panels to have desired characteristics. Furthermore, the plurality of light emitting elements are not limited to an LED, but would be a miniature lump, EL element, and other various types of light emitting elements. Even in such a case, when a liquid crystal display device is configured so that a plurality of light emitting elements are selected from the whole of light source and turned on, the beneficial effects similar to those of the embodiment can be obtained.

Moreover, it is needless to say, although the above explanation has been made of a liquid crystal display device configured in accordance with the embodiment and having the configuration similar to that of the first embodiment, even when the configuration of the embodiment is applied to a liquid crystal display device having the configuration similar to those of the second and third embodiments, beneficial effects similar to those of the embodiment can be obtained.

Figure 10:
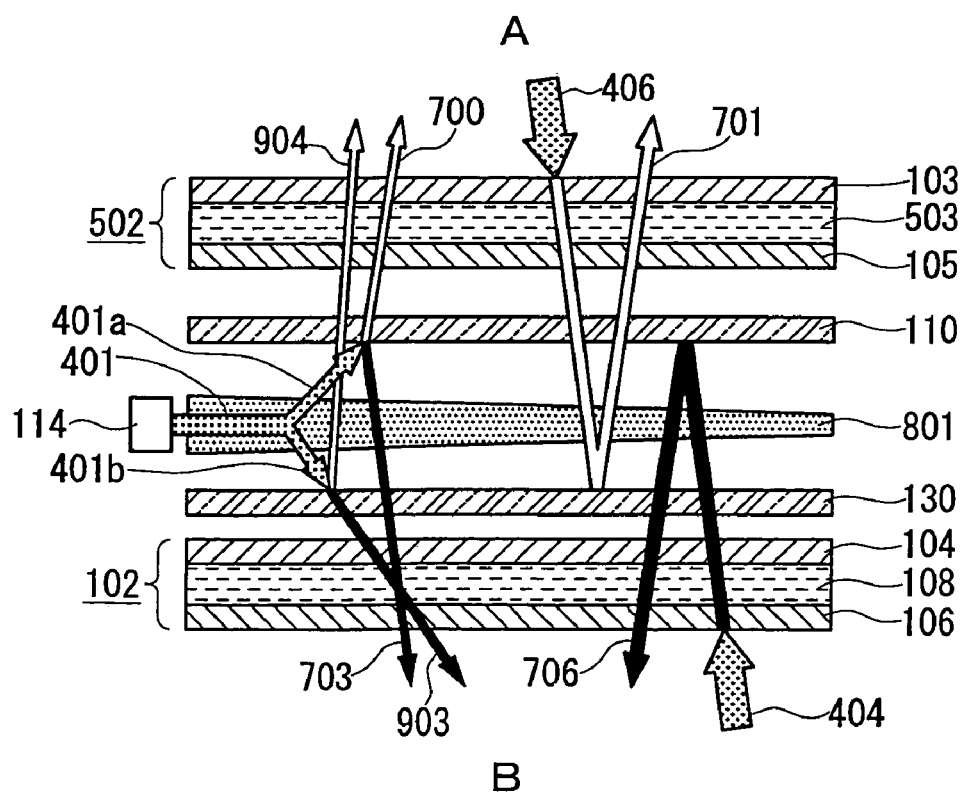
FIG. 10 is a schematic cross sectional view, similar to that of FIG. 8, to explain how the liquid crystal display device of a fifth embodiment according to the invention performs a display function.
Figure 11:
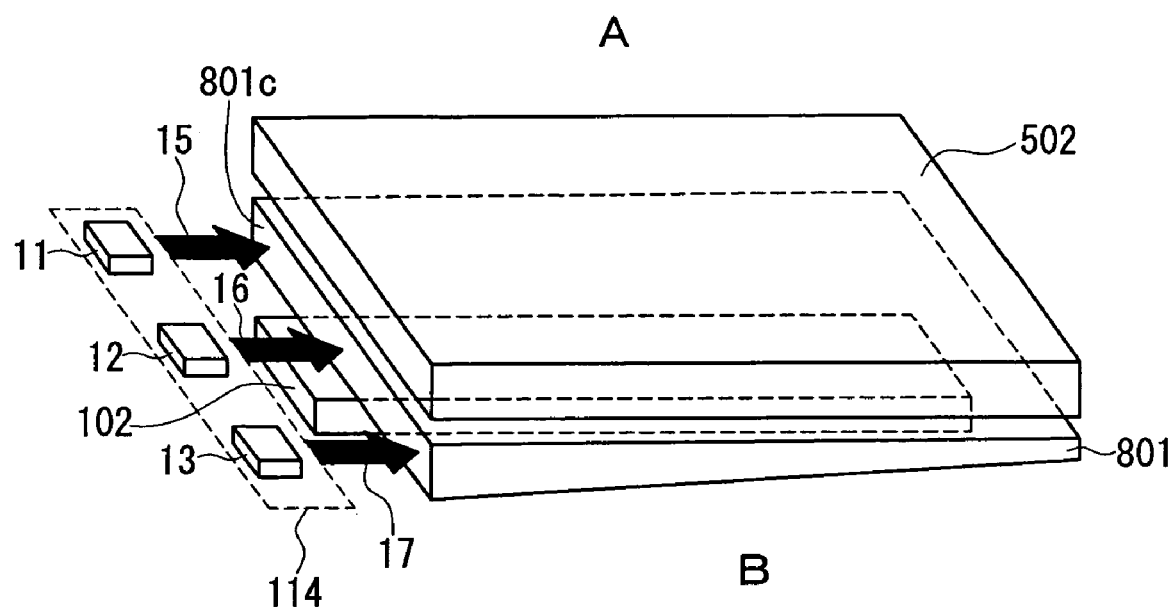
FIG. 11 is a perspective view of the general configuration of the liquid crystal display device of the fifth embodiment, omitting illustration of two polarization separators.
Figure 12:
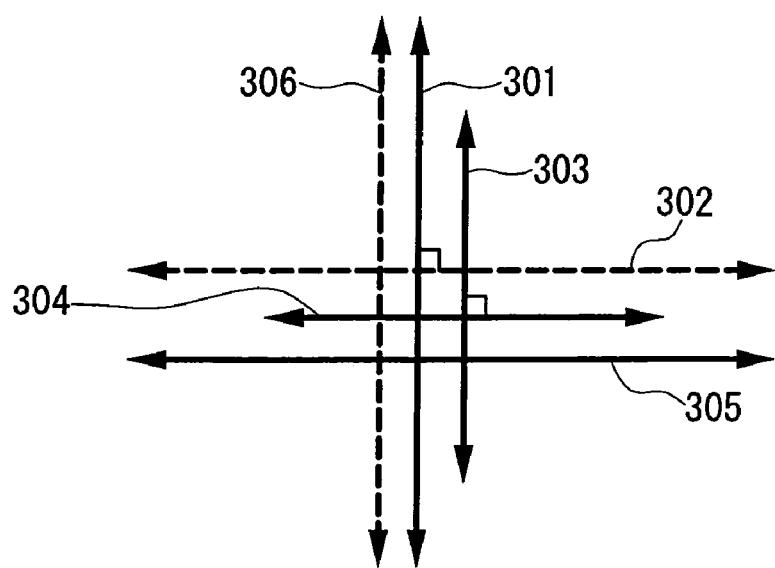
FIG. 12 is an explanatory diagram illustrating a positional relationship between the individual polarization axes of second, third polarizers and first, second polarization separators of FIG. 10.

Fifth Embodiment: FIGS. 10 to 12

Thereafter, a fifth embodiment of the liquid crystal display device according to the invention will be explained.

FIG. 10 is a schematic cross sectional view, similar to that of FIG. 8, to explain how the liquid crystal display device performs a display function and FIG. 11 is a perspective view of the general configuration of the liquid crystal display device, omitting illustration of two polarization separators, and FIG. 12 is an explanatory diagram illustrating a positional relationship between the individual polarization axes of second, third polarizers and first, second polarization separators of FIG. 10.

The configuration of the liquid crystal display device is almost all common to the configuration of the liquid crystal display device of the third embodiment shown in FIG. 8, however the present embodiment is different from the third embodiment in that instead of the transflective reflector 120, a second polarization separator 130 having a polarization reflective axis and polarization transmission axis similar to those of the polarization separator 110 is disposed between a second liquid crystal panel 102 and a light guide plate 801. The polarization separator 110 is the same as those of the aforementioned individual embodiments, however it is hereinafter referred to as "first polarization separator" in terms of discrimination of the polarization separator 110 from a second polarization separator 130.

Furthermore, as shown in FIG. 11, the width of the second liquid crystal panel 102 is reduced to about one-third of the width of the first liquid crystal panel 502, causing the second liquid crystal panel 102 to have about one-third of the display area of the first liquid crystal panel 502. Moreover, the embodiment includes a light source 114 comprised of a plurality of light-emitting elements, i.e., three LEDs 11 to 13 and has the configuration similar to that of the fourth embodiment shown in FIG. 9 except that the light guide plate 112 of FIG. 9 is replaced by a wedge-shaped light guide plate 801 and the first liquid crystal panel 101 of FIG. 9 is replaced by a liquid crystal panel 502 having no transflective layer.

Then, an optical arrangement of a second polarizer 105, first polarization separator 110, and third polarizer 104 in the liquid crystal display device of the present embodiment will be explained with reference to FIG. 12. FIG. 12 is a diagram similar to FIG. 3 and the same signs are used to the same polarization axes as those of FIG. 3, and explanation thereof is omitted. Note that numeral 301 denotes the polarization transmission axis of the first polarization separator 110 and numeral 302 denotes the polarization reflective axis thereof.

It should be noted that a polarization transmission axis 305 of a second polarization separator 130 and a polarization reflection axis 306 thereof orthogonal to the axis 305 are newly illustrated. As shown in FIG. 12, the second polarization separator 130 is disposed so that the polarization transmission axis 305 and polarization reflection axis 306 of the separator 130 are orthogonal to the polarization transmission axis 301 and polarization reflection axis of the first polarization separator 110, respectively.

Accordingly, a polarization transmission axis 303 of a second polarizer 105 is parallel to the polarization transmission axis 301 of the first polarization separator 110 and a polarization transmission axis 304 of a third polarizer 104 is parallel to the polarization transmission axis 305 of the second polarization separator 130. In this case, the polarization transmission axis 303 of the second polarizer 105 and the polarization transmission axis 304 of the third polarizer 104 are orthogonal to each other. The individual polarizers and the individual polarization separators are disposed in accordance with the above-described arrangement. Note that a first polarizer 103 and a fourth polarizer 106 are disposed to allow the individual liquid crystal panels 102, 502 to operate in the normally white mode.

How the embodiment shown in FIG. 10 performs a display function is different from how the third embodiment explained with reference to FIG. 8 performs a display function in that a light flux incident on the second polarization separator 130 travels so that a linearly polarized light component whose polarizing direction is parallel to the polarization transmission axis 305 transmits through the second polarization separator 130 and a linearly polarized light component whose polarizing direction is parallel to the reflection axis 306 is reflected by the second polarization separator 130.

Accordingly, in FIG. 10, a light flux 401a, a portion of the light flux 401 emitted from the light source 114 and incident on the light guide plate 801, exits to the side of the first polarization separator 110 and the polarized light component, parallel to the polarization transmission axis of the separator 110, of the flux 401a transmits through the separator 110, producing a light flux 700, and the light flux 700 transmits also through the first liquid crystal panel 502 operating in the normally white mode and exits to the viewing side "A". Furthermore, the polarized light component, parallel to the polarization reflection axis of the first polarization separator 110, of the flux 401a is reflected by the separator 110, producing a light flux 703, and the light flux 703 transmits through the light guide plate 801 and also through the second polarization separator 130 because the light flux 703 is a linearly polarized light component parallel to the polarization transmission axis of the separator 130, and transmits also through the second liquid crystal panel 102 operating in the normally white mode and exits to the viewing side "B".

A light flux 401b, a portion of the light flux 401 entering the light guide plate 801, exits to the side of the second polarization separator 130 and is similarly divided by the second polarization separator 130 into two polarized light components, a light flux 903 as a polarized light component parallel to the polarization transmission axis of the separator 130 and a light flux 904 as a polarized light component parallel to the polarization reflection axis thereof, and those light fluxes 903, 904 exit respectively to the viewing sides "B" and "A".

A light flux 706, a portion of the light flux 404 incident from the viewing side "B", transmits through the second liquid crystal panel 102 and the entire light flux 706 transmits through the second polarization separator 130, and is reflected by the first polarization separator 110 and returned back, and exits to the viewing side "B".

A light flux 701, a portion of the light flux 406 incident from the viewing side "A", transmits through the first liquid crystal panel 502 and the entire light flux 701 transmits through the first polarization separator 110, and is reflected by the second polarization separator 130 and returned back, and exits to the viewing side "A".

Accordingly, as is the case with the third embodiment explained referring to FIG. 8, the liquid crystal display device is able to perform image display by using any one of light emitted by the activated light source 114 and incident light from the viewing side "A" or "B", and further provide a brighter display.

Furthermore, when a liquid crystal display device is configured so that a plurality of light emitting elements, LEDs 11 to 13, constitute the light source 114 shown in FIG. 11 and the whole or a portion of the LEDs 11 to 13 is turned on depending on the display area determined by whether both or any one of the first and second liquid crystal panels 502, 102 performs display, allowing the device to reduce its power consumption while performing sufficiently bright display.

Also in this case, it is needless to say, various modifications described after the explanation of the fourth embodiment can similarly be made to the embodiment.

INDUSTRIAL APPLICABILITY

As described so far, according to the present invention, when a liquid crystal display device includes two liquid crystal panels disposed back to back each other to enable the visual recognition of the two liquid crystal panels, the device becomes thin and electronic equipments incorporating therein such liquid crystal display device increases its portability, utilization ratio of light from backlight and reduces its power consumption. Particularly, when a light source is comprised of a plurality of light emitting elements and the number of light emitting elements to be activated to emit light is varied depending on the display area determined by whether both or any one of the two liquid crystal panels performs display, further reduction in power consumption can be achieved.

The liquid crystal display device according to the invention is suitable for use in a display unit of a portable folding phone or a display device of various types of portable electronic equipments, particularly, an electronic equipment needed to perform both-sided display.

What is claimed is:

1. A liquid crystal display device, comprising:
   first and second liquid crystal panels, each including liquid crystal cells having a liquid crystal layer sandwiched between two transparent substrates, disposed back to back with respect to each other to enable visual recognition of the first and second liquid crystal panels;
   a light guide plate disposed between the first and second liquid crystal panels;
   a light source disposed adjacent at least one end surface of the light guide plate; and
   a polarization separator disposed between the first liquid crystal panel and the light guide plate,
   said liquid crystal display device being further configured so that light emitted from the light guide plate is divided into two polarized lights by the polarization separator, one of the two polarized lights exits to a side of the first liquid crystal panel, the other thereof exits to a side of the second liquid crystal panel via the light guide plate,
   wherein the light source comprises a plurality of light emitting elements and wherein the number of light emitting elements to be activated to emit light is allowed to differ depending on whether display is performed by the first liquid crystal panel or the second liquid crystal panel.

2. The liquid crystal display device according to claim 1, wherein a display area of the second liquid crystal panel is smaller than a display area of the first liquid crystal panel.

3. The liquid crystal display device according to claim 2, wherein when display is performed by the first liquid crystal panel, all of the plurality of light emitting elements are allowed to emit light and when display is performed by the second liquid crystal panel, only a specific number of the plurality of light emitting elements are allowed to emit lights to sufficiently illuminate the display area of the second liquid crystal panel.

4. A liquid crystal display device including first and second liquid crystal panels, each consisting mainly of liquid crystal cells each of which has a liquid crystal layer sandwiched between two transparent substrates, disposed back to back each other to enable visual recognition of the first and second liquid crystal panels, said liquid crystal display device comprising:
   a light guide plate disposed between the first and second liquid crystal panels;
   a light source disposed adjacent at least one end surface of the light guide plate; and
   a first polarization separator disposed between the first liquid crystal panel and the light guide plate, and a second polarization separator disposed between the second liquid crystal panel and the light guide plate,
   said liquid crystal display device being further configured so that lights emitted from the light guide plate each are divided into two polarized lights by a corresponding one of the first and second polarization separators, one of the two polarized lights exits to a side of the first liquid crystal panel, the other thereof exits to a side of the second liquid crystal panel, the light source comprises a plurality of light emitting elements, and the number of light emitting elements to be activated to emit light is allowed to differ depending on whether display is performed by the first liquid crystal panel or the second liquid crystal panel.

5. The liquid crystal display device according to claim 4, wherein the first and second liquid crystal panels each have polarizers disposed on both sides of the liquid crystal cell, wherein each of the first and second polarization separators has a polarization transmission axis for transmitting one of linearly polarized light components whose polarizing directions are orthogonal to each other and a polarization reflection axis for reflecting the other of the linearly polarized light components, wherein the polarization transmission axes of the first and second polarization separators are orthogonal to each other, wherein the first polarization separator is disposed so that the polarization transmission axis of the first polarization separator is closely aligned with a polarization transmission axis of the polarizer, facing the first polarization separator, of the first liquid crystal panel, and wherein the second polarization separator is disposed so that the polarization transmission axis of the second polarization separator is closely aligned with a polarization transmission axis of the polarizer, facing the second polarization separator, of the second liquid crystal panel.

6. The liquid crystal display device according to claim 4, wherein a display area of the second liquid crystal panel is smaller than a display area of the first liquid crystal panel.

7. The liquid crystal display device according to claim 6, wherein when display is performed by the first liquid crystal panel, all of the plurality of light emitting elements are allowed to emit light and when display is performed by the second liquid crystal panel, only a specific number of the plurality of light emitting elements are allowed to emit lights to sufficiently illuminate the display area of the second liquid crystal panel.

* * * * *